United States Patent
Ito et al.

(10) Patent No.: US 10,688,988 B2
(45) Date of Patent: Jun. 23, 2020

(54) VEHICLE CONTROL APPARATUS AND VEHICLE CONTROL METHOD

(71) Applicants: DENSO CORPORATION, Kariya, Aichi pref. (JP); TOYOTA JIDOSHA KABUSHIKI KAISHA, Toyota-shi, Aichi-ken (JP)

(72) Inventors: Yosuke Ito, Kariya (JP); Akitoshi Minemura, Kariya (JP); Jun Tsuchida, Okazaki (JP); Masayuki Shimizu, Numazu (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 57 days.

(21) Appl. No.: 15/562,371

(22) PCT Filed: Mar. 29, 2016

(86) PCT No.: PCT/JP2016/060207
§ 371 (c)(1),
(2) Date: Sep. 27, 2017

(87) PCT Pub. No.: WO2016/158989
PCT Pub. Date: Oct. 6, 2016

(65) Prior Publication Data
US 2018/0118204 A1    May 3, 2018

(30) Foreign Application Priority Data
Mar. 31, 2015   (JP) .................................. 2015-072917

(51) Int. Cl.
B60W 30/09   (2012.01)
G08G 1/16    (2006.01)
(Continued)

(52) U.S. Cl.
CPC ......... *B60W 30/09* (2013.01); *B60K 31/0008* (2013.01); *B60W 30/095* (2013.01);
(Continued)

(58) Field of Classification Search
CPC ....... B60W 30/09; G08G 1/161; G08G 1/165; G08G 1/166; G01S 13/931
(Continued)

(56) References Cited

U.S. PATENT DOCUMENTS

2006/0271296 A1* 11/2006 Takeichi ............. G01S 7/52004
701/300
2009/0018740 A1*  1/2009 Noda ........................ B60T 7/22
701/70
(Continued)

FOREIGN PATENT DOCUMENTS

JP    2012215489 A    11/2012

Primary Examiner — Khoi H Tran
Assistant Examiner — Rodney P King
(74) Attorney, Agent, or Firm — Maschoff Brennan

(57) ABSTRACT

A vehicle control apparatus is provided which includes position detecting means for detecting a position of a detected target using reflection information derived from a radar device 21, first determining means for determining whether the detected target is expected to be an obstacle not based on an intensity of a received reflected wave contained in the reflection information, and second determining means for determining whether an obstacle exists at the position, as detected by the position detecting means, or not using the image information. When the second determining means determines that the obstacle exists, and when a distance between an own vehicle and the detected target is smaller than a given threshold value, the detected target is determined as a target with which collision should be avoided regardless of a result of determination made by the first determining means. Alternatively, when the distance to the detected target is greater than the given threshold value, and
(Continued)

when the first determining means determines that the detected target is expected to be the obstacle, the detected target is determined as a target with which collision should be avoided. This minimizes an unnecessary operation in control to avoid the collision when it is determined whether the target is an obstacle to movement of the own vehicle or not.

10 Claims, 5 Drawing Sheets

(51) Int. Cl.
    *G01S 13/93*     (2020.01)
    *B60W 30/095*     (2012.01)
    *B60K 31/00*     (2006.01)
    *G06K 9/62*     (2006.01)
    *G06K 9/00*     (2006.01)
    *G01S 13/931*     (2020.01)
    *G01S 13/86*     (2006.01)

(52) U.S. Cl.
    CPC ....... *B60W 30/0956* (2013.01); *G01S 13/931* (2013.01); *G06K 9/00805* (2013.01); *G06K 9/6293* (2013.01); *G08G 1/161* (2013.01); *G08G 1/165* (2013.01); *G08G 1/166* (2013.01); *B60W 2420/42* (2013.01); *B60W 2420/52* (2013.01); *B60W 2554/00* (2020.02); *B60W 2554/4041* (2020.02); *B60Y 2400/3015* (2013.01); *B60Y 2400/3017* (2013.01); *G01S 13/867* (2013.01)

(58) Field of Classification Search
    USPC .......................................................... 701/45
    See application file for complete search history.

(56) References Cited

U.S. PATENT DOCUMENTS

2010/0100268 A1*   4/2010   Zhang ................... B60W 30/09
                                                    701/25
2013/0310067 A1*  11/2013   Nakata .................. H04W 64/00
                                                    455/456.1
2014/0222280 A1*   8/2014   Salomonsson ......... G08G 1/167
                                                    701/28

* cited by examiner

VEHICLE CONTROL APPARATUS AND VEHICLE CONTROL METHOD

TECHNICAL FIELD

The present invention generally relates to a vehicle control apparatus which works to actuate a safety device mounted in an own vehicle (which will also be referred to below as a subject vehicle) which has the vehicle control apparatus installed therein when a risk that the subject vehicle will collide with a target object present ahead in a direction in which the subject vehicle is traveling increases and a vehicle control method.

BACKGROUND ART

Pre-Crash Safety (PCS) systems have been realized which work to reduce or avoid damage to an own vehicle caused by collision with a target, such as another vehicle, a pedestrian, or a road structure present ahead in a direction of travel of the own vehicle. The PCS system determines a time-to-collision that is a time it is expected to take for the own vehicle to collide with the target based on a relative distance between the own vehicle and the target, a relative speed to the target, and a relative acceleration to the target and then warns a driver in the own vehicle of approach to the target using a warning device or actuate a brake system of the own vehicle.

The PCS system may detect an iron plate, such as a manhole cover, as the target. Such a type of iron plate does not obstruct the traveling of the own vehicle. If it is treated as a target to be managed by the warning device or the braking device, its operation will be unnecessary.

There is a vehicle control apparatus, as taught in Japanese Patent First Publication No. 2012-215489, which is designed to determine whether a detected target is an obstacle which causes an obstruction to traveling of an own vehicle or not. The vehicle control apparatus determines whether the detected object is the obstacle or not using a reflection intensity of a wave reflected from the target.

SUMMARY OF THE INVENTION

Problem to be Solved by the Invention

When a plurality of vehicles are present ahead in a direction of travel of the own vehicle, it may be impossible to accurately measure a reflection intensity due to noise. A failure in accurately measuring the reflection intensity may cause an obstacle to be mistakenly determined as a non-obstacle or vice versa. If a result of such a determination is used to determine whether the warning device or the braking device should be actuated or not, it will result in a failure in performing a control operation to avoid an accidental collision with an obstacle which will interfere with the traveling of the own vehicle or cause an unnecessary operation to be made to avoid a collision with an object which will not interfere with the traveling of the own vehicle.

The invention was made to solve the above problems. It is a principal object of the invention to provide a vehicle control apparatus which is capable of eliminating a failure in performing a control operation to avoid a collision with a target when it is determined whether the target is an obstacle or not which obstructs traveling of an own vehicle.

Means for Solving the Problem

The first invention is a vehicle control apparatus which obtains, from a radar device which transmits a probe wave forward in a travel direction of an own vehicle and receives a reflected wave that is a reflection of the probe wave from a target, reflection information about the reflected wave, and which also obtains image information from an image capturing device which captures an image in front of the own vehicle. The vehicle control apparatus comprises: position detecting means for detecting a position of a detected target using said reflection information derived from said radar device; first determining means for determining whether said detected target is expected to be an obstacle to forward movement of said own vehicle in the travel direction thereof or not based on an intensity of the received reflected wave contained in said reflection information; second determining means for determining whether an obstacle which is expected to obstruct movement of the own vehicle exists at said position, as detected by said position detecting means, or not using the image information derived from said image capturing device; and collision avoidance means for performing control to avoid collision with the detected target based on a distance to said detected target. When said second determining means determines that an obstacle exists, and when a distance between said own vehicle and said detected target is smaller than a given threshold value, said collision avoidance means determines the detected target as a target with which collision should be avoided regardless of a result of determination made by said first determining means. When the distance between said own vehicle and said detected target is greater than the given threshold value, and when said first determining means determines that the detected target is expected to be an obstacle, said collision avoidance means determines the detected target as a target with which collision should be avoided.

The first determining means determines whether there is an obstacle or not based on the intensity of a reflected wave received, an error in such a determination may occur depending upon surrounding environments. The smaller the distance, the better the accuracy in the determination made by the second determining means. In the above arrangements, when the distance is smaller than the threshold value, so that the accuracy in the determination made by the second determining means is high, and when the second determining means determines that there is an obstacle, the detected target is determined as a target for which collision avoidance control should be executed regardless of a result of the determination made by the first determining means which may lead to an error in the determination, thereby avoiding an unnecessary operation in the collision avoidance control. Alternatively, when the distance is greater than the threshold value, so that the accuracy in the determination made by the second determining means is low, it is determined whether there is a target for which the collision avoidance control should be executed or not based on the result of the determination made by the first determining means. This enables a determination of whether the detected target should be determined as a target for which the collision avoidance control should be executed or not to be made in advance when the distance to the detected target is long, thereby minimizing a delay in operation of the collision avoidance control.

The second invention is characterized in that when said second determining means determines that the obstacle exists, and when the first determining means determines that said detected target is expected to be an obstacle, said collision avoidance means determines the detected target as a target with which collision should be avoided. Alternatively, when the first determining means determines that said detected target is expected not to be an obstacle, and when a distance between the own vehicle and the detected target is smaller than a given threshold value, said collision avoidance means determines the detected target as a target with which collision should be avoided.

The second invention offers the same beneficial advantages as in the first embodiment.

EMBODIMENT FOR CARRYING OUT THE INVENTION

Each embodiment will be described below using the drawings. Throughout the drawings, the same reference numbers will refer to the same or equivalent portions in the following embodiments, and the explanation thereof will be omitted.

First Embodiment

A vehicle control apparatus according to this embodiment is mounted on a vehicle (i.e., an own vehicle) and functions as a PCS system which works to detect a target present ahead around the own vehicle in a direction of travel of the own vehicle and perform a vehicle control method to avoid a collision with the target or reduce damage caused by the collision.

Figure 1:
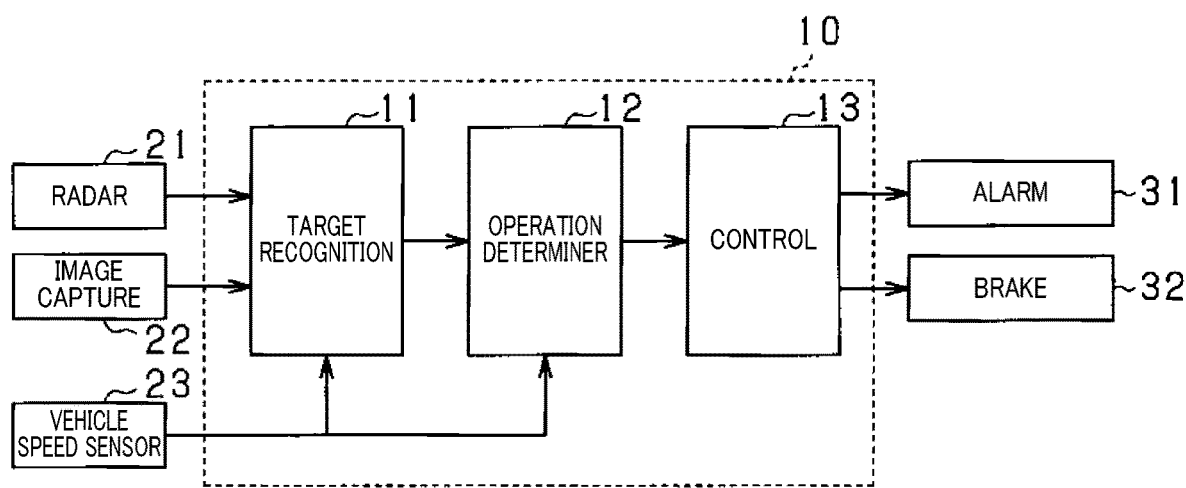
FIG. 1 is a structural view of a vehicle control apparatus.

In FIG. 1, the driver-assistance ECU 10 which works as the vehicle control apparatus is implemented by a computer equipped with a CPU, a ROM, a RAM, and an I/O. The driver-assistance ECU 10 performs programs, as stored in the ROM, using the CPU to achieve a variety of functions.

The driver-assistance ECU 10 has the radar device 21, the image capturing device 22, and the vehicle speed sensor 23 connected thereto which work as sensing devices into which various types of detected information.

The radar device 21 is, for example, a known millimeter-wave radar in which a high-frequency signal in a millimeter waveband is used as a transmit wave, arranged a front end portion of the own vehicle, has a range within a given detecting angle as a detecting range in which a target is detectable, and determines a position of the target in the detecting range. Specifically, the radar device 21 transmits a probe wave in a given cycle and receive reflections or echoes thereof using a plurality of antennas. The radar device 21 calculates a distance to the target using a transmit time of the probe wave and a reception time of the echo, determines a relative speed of the target using a frequency changed by the Doppler effect on the echo from the target, and also calculates an azimuth direction of the target using a phase difference of the echoes received by the antennas. A relative position of the target to the own vehicle is achieved by determining the position and the azimuth direction of the target. The radar device 21 transmits a probe wave, receives an echo, calculates a position of the echo and the relative speed, and outputs first detection information (i.e., reflection information) about the calculated echo position, the relative position, the relative speed, and an echo intensity to the driver-assistance ECU 10.

The image capturing device 22 is implemented by a monocular image capturing device, such as a CCD camera, a CMOS image sensor, or a near-infrared camera. The image capturing device 22 is mounted at the center of the vehicle in the widthwise direction of the vehicle and located at a given level. The image capturing device 22 captures an image of an overview of a region within a given angle in front of the vehicle. The image capturing device 22 extracts a feature in the captured image which represents the existence of a target. Specifically, the image capturing device 22 extracts edges in the captured image based on brightness information about the captured image and performs a Hough transform on the extracted edges. In the Hough transform, for instance, dots on a straight line on which a plurality of edges are successively arranged or intersections between straight lines are extracted as features. The image capturing device 22 captures an image, extracts features with a control period which is the same as or different from the radar device 21, and output second detection information (i.e., image information) about results of extraction of the features to the driver-assistance ECU 10.

The vehicle speed sensor 23 is mounted on a rotational axis through which power is transmitted to a wheel of the own vehicle and measures a speed of the own vehicle as a function of the number of revolutions of the rotational axis.

The own vehicle is equipped with the warning device 31 and the braking device 32 as safety devices which are actuated in response to control commands from the driver-assistance ECU 10.

The warning device 31 is implemented by a speaker or display mounted in an occupant compartment of the own vehicle. When determining that there is an increased probability of collision with a target, the warning device 31 works to output an alarm sound or an alarm message to inform the driver of a collision hazard in response to the control command outputted from the driver-assistance ECU 10.

The braking device 32 is designed to apply a brake to the own vehicle. When the driver-assistance ECU 10 determines that a probability of collision with a target has become high, the braking device 32 is actuated in response to the control command from the driver-assistance ECU 10. Specifically, the braking device 32 increases the braking force, as developed by a braking operation made by the driver, (i.e., a brake assist function) or performs an automatically braking operation when the braking operation is not made by the driver (i.e., an automatic braking function).

The target recognition section 11 obtains the first detection information (i.e., the reflection information) from the radar device 21 and the second detection information (i.e., the image information) from the image capturing device 22. The target recognition section uses a first position, as derived from the first detection information, and features, as derived from the second detection information, to determine nearby features as arising from the same target (i.e., a detected target). When the features exist near the first position, it means that there is a high probability that a target actually exists at the first position. The target recognition section 11, therefore, performs prepared pattern matching on the second detection information to determine whether the target is a vehicle or a pedestrian (i.e., a passerby). The target recognition section 11, thus, functions as a position detecting means.

Subsequently, the target recognition section 11 associates the relative distance and the relative speed to the own vehicle with each target and uses the relative distance and the relative speed to calculate a longitudinal distance that is the relative speed and a longitudinal speed that is the relative speed in the travel direction of the own vehicle. The target recognition section 11 also uses the relative speed of the target and the speed of the own vehicle to determine whether the target is a stationary object, an object moving in the same direction as the own vehicle, or an object moving in a direction opposite the own vehicle.

The operation determining section 12 uses operation timings and a time-to-collision to determine whether the safety devices should be operated or not. The operation timings are set for the warning device 31 and the braking device 32 that are the safety devices, respectively. Specifically, the operation timing of the warning device 31 is determined as the earliest timing. This is because when the driver notices the danger of collision from the warning device 31 and depresses the brake pedal, it will avoid the collision without having to output the control command to the braking device 32 through the driver-assistance ECU 10. The braking device 32 has two operation timings: one being set for the brake assist function, and the second being set for the automatic braking function. These operation timings may be identical with or different from each other.

The time-to-collision is a length of time required by the own vehicle to collide with the target and calculated using the longitudinal speed and the longitudinal distance, as derived from the target recognition section 11. The relative acceleration may be used instead of the longitudinal speed.

When the own vehicle 40 and the target move close to each other, so that the time-to-collision is decreased, the time-to-collision is first set as the operation timing of the warning device 31. The operation determining section 12 then outputs an operation determining signal for the warning device 31 to the control processing section 13. The control processing section 13 receives the operation determining signal and then outputs the control command signal to the warning device 31, thereby actuating the warning device 31 to inform the driver of the danger of collision.

When, after the warning device 31 is actuated, the own vehicle 40 and the target further move close to each other when the driver is not depressing the brake pedal, so that the time-to-collision is further decreased, the time-to-collision is set as the operation timing of the automatic braking function. The operation determining section 12 then outputs the operation determining signal for the automatic braking function to the control processing section 13. The control processing section 13 receives the operation determining signal and then outputs the control command signal to the braking device 32, thereby actuating the braking device 32 to apply a brake to the own vehicle 40.

When the driver is depressing the brake pedal, but the time-to-collision is decreased, the time-to-collision is set as the operation timing of the brake assist function. The operation determining section 12 then outputs the operation determining signal for the brake assist function to the control processing section 13. The control processing section 13 receives the operation determining signal and outputs the control command signal to the braking device 32, thereby actuating the braking device 32 to increase the braking force as a function of a degree of depression of the brake pedal made by the driver. When actuating the above described safety devices, a combination of the operation determining section 12 and the control processing section 13 works as a collision avoidance means.

Figure 2:
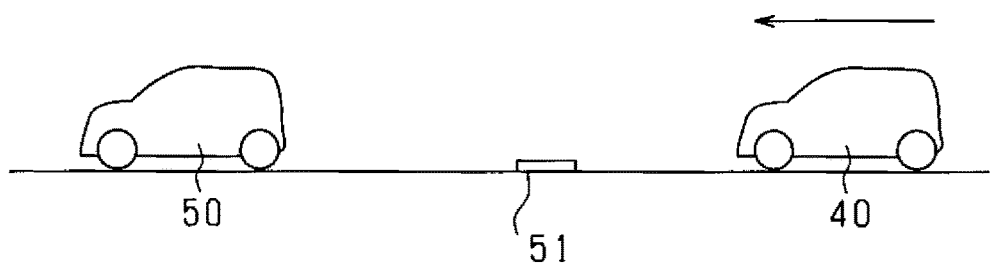
FIG. 2 is a view which illustrates a condition where processing is executed according to the first embodiment.

If the above safety devices are actuated for a target which is not expected to obstruct the movement of the own vehicle 40, they will be unnecessary operations. For instance, when a vehicle 50 and an iron plate 51, such as a manhole cover, as demonstrated in FIG. 2, exist in front of the own vehicle 40 in the travel direction thereof, the radar device 21 determines locations or positions of the vehicle 50 and the iron plate 51. In the illustrated example, the vehicle 50 is an obstruction to the movement of the own vehicle 40 and thus needs to be determined as a target for which the safety devices should be actuated, while the iron plate 51 is not an obstruction to the movement of the own vehicle 40 and thus should not be determined as a target for which the safety devices should be actuated.

Figure 3:
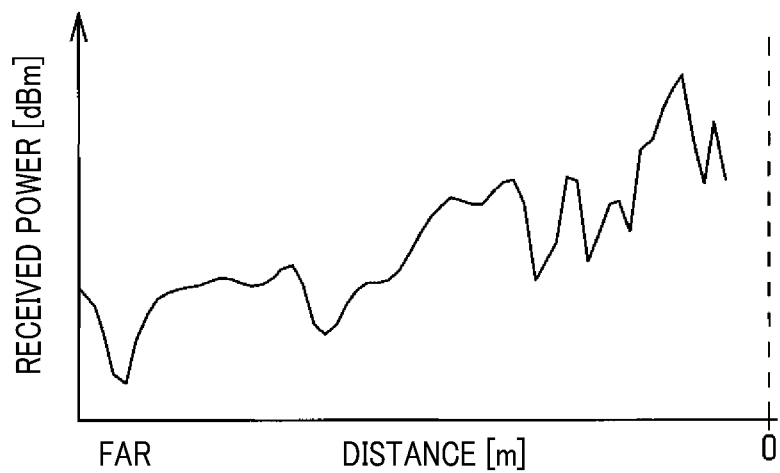
FIG. 3 is a view which represents an intensity of a received wave reflected from another vehicle.

The determination of whether a target is expected to be an obstacle or not is achieved by obtaining received power representing the intensity of a reflected wave or echo for a given period of time to determine whether the target is the vehicle 50 (i.e., an obstacle) or the iron plate 51 (i.e., a non-obstacle). When making such a determination, the target recognition section 11 functions as a first determining means. FIG. 3 illustrates a relation between a distance to the vehicle 50 and a received power of wave or echo reflected from the vehicle 50. There are two echoes reflected from the vehicle 50: one being inputted directly to the radar device 21, and the other being reflected on the road surface and then inputted into the radar device 21. The echo will, thus, be multipath reflected waves. When phases of the reflected waves are identical with each other, it will result in an increase in the received power. Alternatively, when the phases of the reflected waves are different from each other, it will result in a decrease in the received power. Such a phase difference depends upon a distance between the own vehicle 40 and the vehicle 50, so that the received power is, as demonstrated in FIG. 3, sequentially increased or decreased as a function of the distance between the own vehicle 40 and the vehicle 50.

Figure 4:
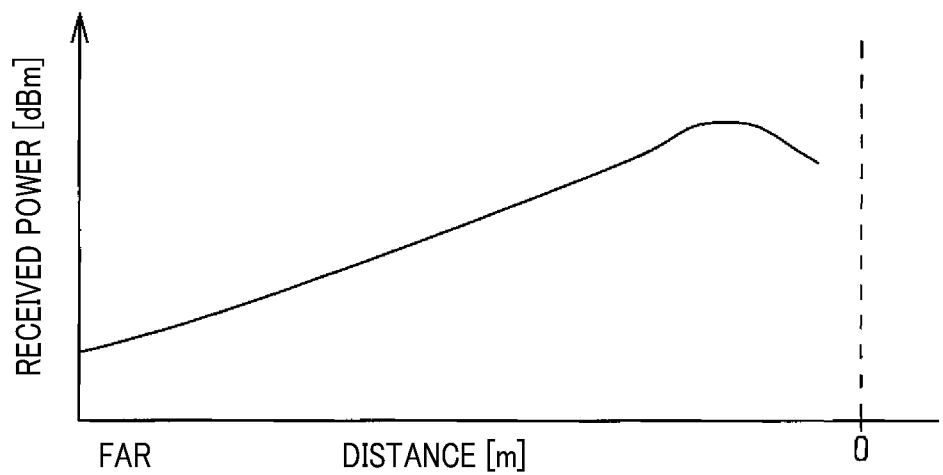
FIG. 4 is a view which represents an intensity of a received wave reflected from an iron plate on a road surface.

FIG. 4 represents a distance to the iron plate 51 and a received power of an echo reflected from the iron plate 51. When there is no object around the iron plate 51, the received power of the echo reflected from the iron plate 51 monotonically increases as the iron plate 51 approaches the own vehicle 40. The determination of whether the target is an obstacle to movement of the own vehicle 40 or not is, therefore, achieved using the distance and the received power.

When another target exists around the vehicle 50, a wave which has been reflected from the target and then from the road surface may not be received by the radar device 21, which causes a received power of the reflected wave, unlike in FIG. 3, to be close to that of wave reflected from the iron plate 51, as indicated in FIG. 4. In this case, a determination of whether the target should be treated as a target or not for which the safety device should be actuated using the received power may lead to an unnecessary operation of the safety device.

In this embodiment, a determination of whether an obstacle, such as a vehicle, exists at a location indicated by the first detection information or not is, as described above, made using the second detection information derived from the image capturing device 22. When making such a determination, the target recognition section 11 functions as a second determining means. The accuracy of the second detection information, as derived from the image capturing device 22, however, decreases with an increase in distance between the own vehicle 40 and the target. This is because the determination of whether there is a target or not is made using the pattern matching technique, which may cause a pedestrian crosswalk printed on a distant road surface to be determined as the vehicle 50.

When the accuracy in the determination based on the second detection information is high, in other words, the relative distance is small, a determination of whether there is a target for which the safety device should be actuated or not is made using the second detection information. Alternatively, when the relative distance is great, in other words, the accuracy in the determination based on the second detection information is low, so that it is determined based on the first detection information that the target is the iron plate 51 which is not an obstacle to the movement of the own vehicle 40, the iron plate 51 is not determined as a target for which the safety devices should be actuated. Alternatively, when it is determined that the target is not the iron plate 51, but an obstacle to the movement of the own vehicle 40, it is determined as a target for which the safety devices should be actuated.

Figure 5:
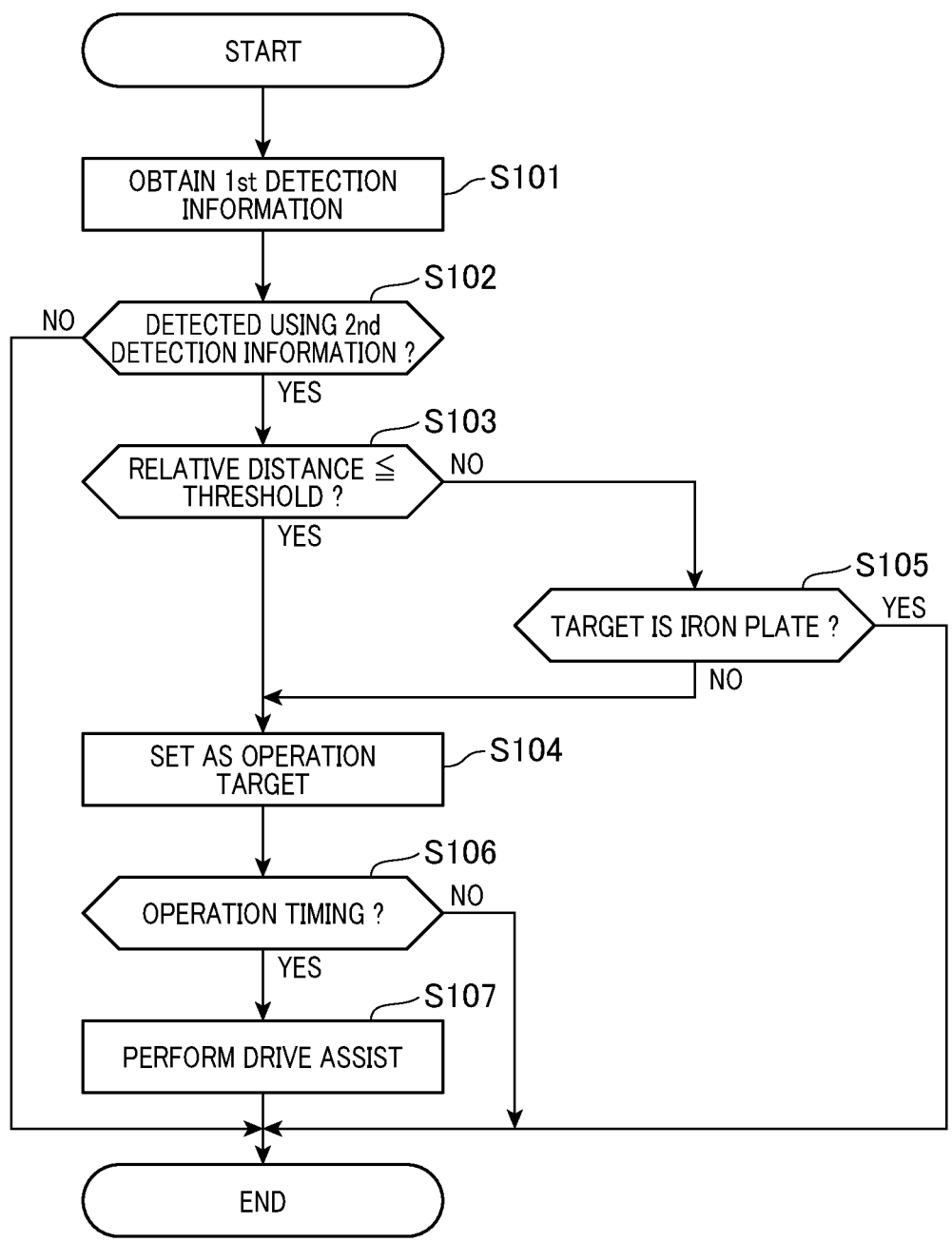
FIG. 5 is a flowchart which represents processing in the first embodiment.

A sequence of steps performed by the driver-assistance ECU 10 to determine whether there is a target for which the safety device should be actuated or not will be described below using a flowchart of FIG. 5. The sequence of steps in the flowchart is executed at a given control interval for each target existing in front of the own vehicle in the travel direction thereof.

First, the first detection information is derived from the radar device 21 (S101). It is determined that a detected target exists at a position calculated based on the first detection information. Subsequently, it is determined using the second detection information derived from the image capturing device 22 whether an obstacle to the movement of the own vehicle exists at the position of the detected target derived from the first detection information or not (S102). If it is determined that there is not an obstacle based on the second detection information (NO in step S102), it means that there is a high probability that there is no obstacle at the position determined based on the first detection information. The routine then terminates.

Alternatively, if it is determined that there is an obstacle based on the second detection information (YES in step S102), it is determined whether a relative distance between the own vehicle and the detected target is lower than or equal to a threshold value (S103). If the relative distance is determined to be lower than or equal to the threshold value (YES in step S103), it means that the accuracy in processing for detecting an obstacle based on the second detection information is high, so that the detected target is determined as a target for which the safety device should be actuated (S104). Alternatively, if the relative distance is greater than the threshold value (NO in step S103), it is determined using the received power whether the detected target is an iron plate existing on the road surface or not (S105). If it is determined that the detected target is an iron plate (YES in step S105), the detected target is determined not to be a target for which the safety device should be actuated. The routine then terminates. Alternatively, if it is determined that the detected target is not an iron plate (NO in step S105), the detected target is determined to be a target for which the safety device should be actuated (S104).

Subsequently, it is determined whether the time-to-collision with the detected target, as determined to be the target for which the safety device should be actuated, has reached the operation timing of the safety device or not (S106). If the operation timing of the safety device has been reached (YES in step S106), the safety device is actuated (S107). Alternatively, if the operation timing of the safety device has not been reached (NO in step S106), then the routine terminates.

When the own vehicle has moved, so that the relative distance to the detected target has become short, a YES answer will be eventually obtained in step S103. In this case, the determination using the second detection information is made with high accuracy. It is, thus, possible to properly actuate the safety device.

With the above arrangements, the vehicle control apparatus of this embodiment offers the following beneficial advantages.

When it is determined whether there is an obstacle or not based on the intensity of a reflected wave or echo received, an error in such a determination may occur depending upon surrounding environments. The smaller the distance, the better the accuracy in the determination made using the image processing techniques. In this embodiment, when the distance is smaller than the threshold value, so that the accuracy in the determination using the image processing techniques is high, and when it is determined that there is an obstacle using the second detection information, the detected target is determined as a target for which the safety device should be actuated regardless of a result of the determination using the intensity of the received power which may result in a risk of error in the determination, thereby avoiding the unnecessary operation of the safety device. Alternatively, when the distance is greater than the threshold value, so that the accuracy in the determination using the image processing techniques is low, it is determined whether there is a target for which the safety device should be actuated or not based on the result of the determination using the intensity of the received power. This enables a determination of whether the detected target should be determined as a target for which the safety device should be actuated or not to be made in advance when the distance to the detected target is long, thereby minimizing a delay in actuating the safety device.

Second Embodiment

Figure 6:
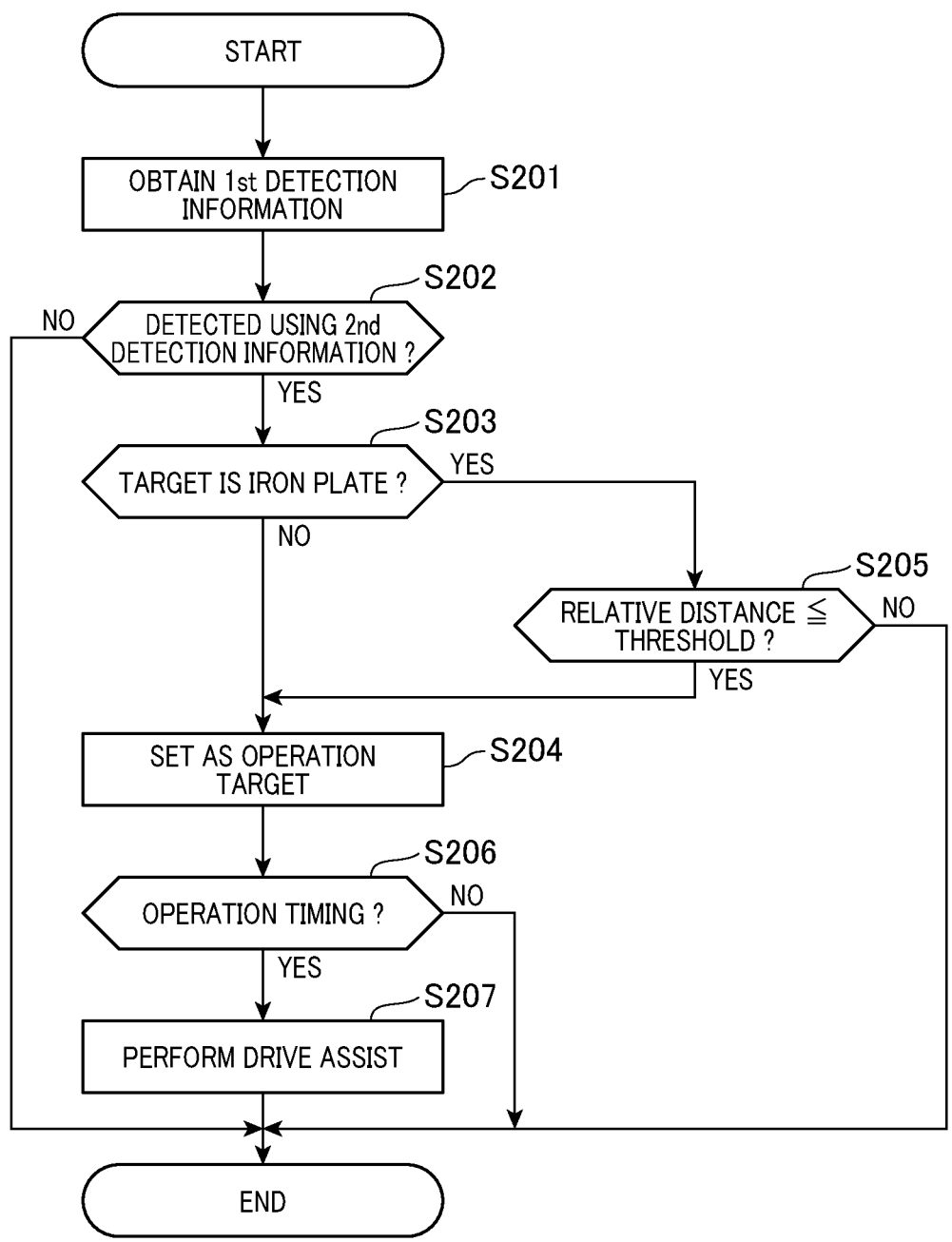
FIG. 6 is a flowchart which represents processing in the second embodiment.

A vehicle control apparatus of this embodiment has an overall structure common to that in the first embodiment, but different in part of the processing. A sequence of steps executed by the driver-assistance ECU 10 in this embodiment will be described below using a flowchart of FIG. 6. The sequence of steps in the flowchart is executed at a given control interval for each target existing in front of the own vehicle in the travel direction thereof.

First, the first detection information is derived from the radar device 21 (S201). It is determined that a detected target exists at a position calculated based on the first detection information. Subsequently, it is determined using the second detection information derived from the image capturing device 22 whether an obstacle to the movement of the own vehicle exists at the position of the detected target derived from the first detection information or not (S202). If it is determined that there is not an obstacle based on the second detection information (NO in step S202), it means that there is a high probability that there is no obstacle at the position determined based on the first detection information. The routine then terminates.

If it is determined that there is an obstacle based on the second detection information (YES in step S202), it is determined using the received power whether the detected target is an iron plate existing on the road surface or not (S203). If it is determined that the detected target is not an iron plate (NO in step S203), it means that the first detection information and the second detection information each indicate that the detected target is an obstacle. The degree of reliability of results of such a determination is, thus, high. The detected target is, therefore, determined as a target for which the safety device should be actuated (S204). Alternatively, if it is determined that the detected target is an iron plate (YES in step S203), it is determined whether the relative distance between the own vehicle and the detected target is lower than or equal to a threshold value (S205). If the relative distance is lower than or equal to the threshold value (YES in step S205), it means that the accuracy in processing for detecting an obstacle based on the second detection information is high. The detected target is, therefore, determined as a target for which the safety device should be actuated (S204). Alternatively, if the relative distance is greater than the threshold value (NO in step S205), it means that the accuracy in processing for detecting an obstacle based on the second detection information is low, and that the first detection information indicates that the detected target is not an obstacle, the routine then terminates to avoid unnecessary operation of the safety device.

Subsequently, it is determined whether the time-to-collision with the detected target, as determined to be the target for which the safety device should be actuated, has reached the operation timing of the safety device or not (S206). If the operation timing of the safety device has been reached (YES in step S206), the safety device is actuated (S207). Alternatively, if the operation timing of the safety device has not been reached (NO in step S206), then the routine terminates.

In the above way, the vehicle control apparatus offers the same beneficial advantages as in the first embodiment.

Third Embodiment

A vehicle control apparatus of this embodiment has an overall structure common to that in the first and third embodiments, but different in part of the processing.

Figure 7:
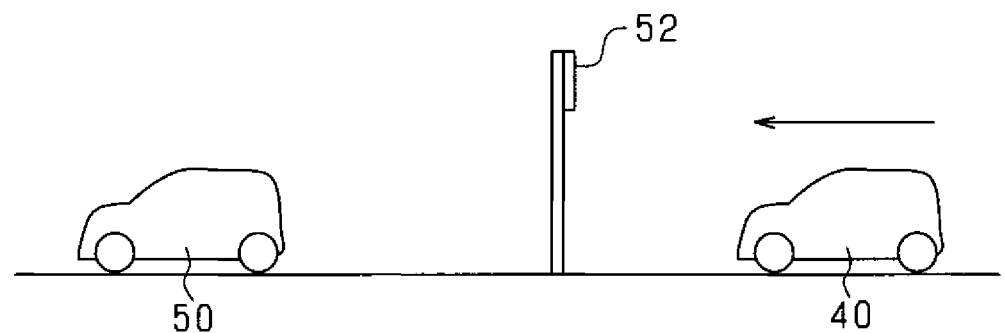
FIG. 7 is a view which illustrates a condition where processing is executed according to the third embodiment.

When there is, as illustrated in FIG. 7, the signboard 52 located above the overall height of the own vehicle 40 in front of the own vehicle 40 in the travel direction thereof, the own vehicle 40 will not collide with the signboard 52. It is, thus, unnecessary to determine the signboard 52 as a target for which the safety device should be actuated. In this case, the intensity of a reflected wave (i.e., a received power) is used, like in the first embodiment, to determine whether the detected target is the vehicle 50 which is expected to obstruct movement of the own vehicle 40 or the signboard 52 which is not an obstacle to the movement of the own vehicle 40.

Figure 8:
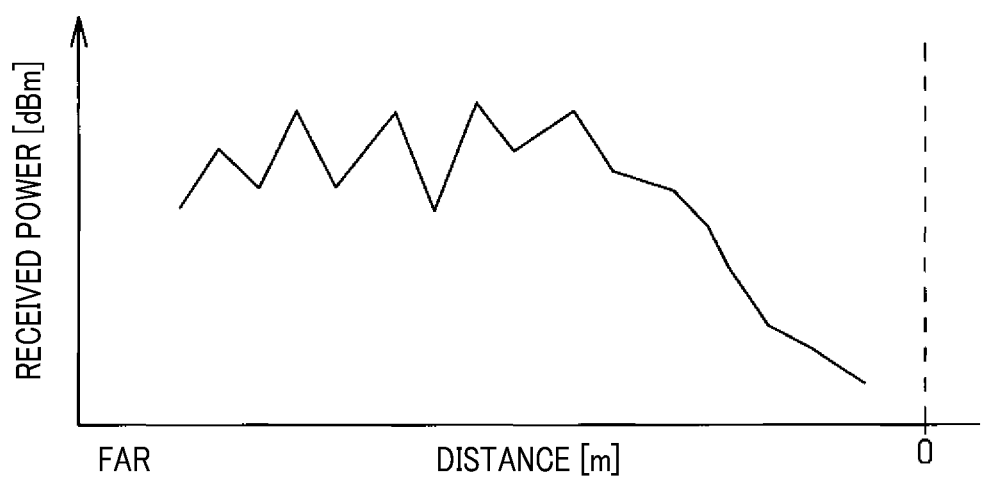
FIG. 8 is a view which illustrates an intensity of a received wave reflected from a signboard located above.

FIG. 8 represents a power of a received wave reflected from the signboard 52. The wave reflected from the signboard 52 is, like that reflected from the vehicle 50, partly reflected on the road surface and then inputted to the radar device 21. The reflected wave, therefore, becomes a multi-path wave whose power increases or decreases depending upon the relative distance of the signboard 52 to the own vehicle 40. The reflected wave from a target is located above the overall height of the own vehicle 40 has an angle of incidence on the radar device 21 which becomes great with a decrease in distance between the target and the own vehicle 40, thereby resulting in a decrease in power of the reflected wave received by the radar device 21.

The intensity of a wave reflected from a vehicle other than the own vehicle 40 usually increases with a decrease in distance between such a vehicle and the own vehicle 40. The intensity of the received wave may, therefore, be obtained for a given period of time to determine whether the detected target is an obstacle to movement of the own vehicle 40 or not using a relation between the intensity of the received wave and the distance between the vehicle and the own vehicle 40.

This embodiment has a risk, like the first embodiment, that when a plurality of vehicles exist around the own vehicle, the detected target which is actually an obstacle is determined as a non-obstacle. The second detection information derived from the image capturing device 22 is, therefore, used to execute processing based on that indicated in the flowchart of FIG. 5 in the first embodiment or in the flowchart of FIG. 6 in the second embodiment.

The vehicle control apparatus of this embodiment, thus, offers the same beneficial advantages as those in the first embodiment.

Modifications

If it is determined using the second detection information that an obstacle does not exist at a location derived based on the first detection information (NO in step S102), a determination of whether the detected target is the iron plate 51 or an obstacle may be made. If the detected target is determined to be the obstacle, it may be selected as a target for which the safety device should be actuated. In this case, however, a probability that the detected target is an obstacle is low, thus permitting the operation timing of the safety device to be postponed.

When a determination that the detected target is an obstacle is made successively more than a given number of times, it means results of such determinations have a high reliability. The detected target may be determined as a target for which the safety device should be actuated regardless of results of the determination using the intensity of a received wave.

In the first and second embodiment, the iron plate 51 on the road surface is exemplified as an object (i.e., a non-obstacle) which is expected not to disturb the movement of the own vehicle, but another object may be treated as the non-obstacle. For example, an object which is located below a minimum ground clearance of a body of the own vehicle or over which the own vehicle can move may be treated as a non-obstacle. The third embodiment exemplifies the signboard 52 as an object (i.e., a non-obstacle) which is expected not to interfere the movement of the own vehicle, but however, another object may be treated as a non-obstacle as long as it is located above the overall height of the own vehicle.

In the embodiments, the time-to-collision is calculated and compared with the operation timing to determine whether the safety device should be actuated or not, but however, an operable range of the safety device may be defined in front of the own vehicle in the travel direction thereof to determine whether the safety device should be actuated or not depending upon whether the detected target lies in the operable range or not.

In the first embodiment, the relative distance to the detected target is compared with the threshold value, but however, the longitudinal distance may alternatively be compared with the threshold value.

The safety devices mounted in the own vehicle are not limited to those referred to in the above embodiments. For instance, a steering system which works to avoid collision with an object may be used.

The above embodiments are designed to avoid collision with an object present ahead of the vehicle, but however, may alternatively be used with a system which detects an obstacle behind the vehicle and then avoids collision with an obstacle or which avoids collision with an obstacle approaching the vehicle. "Forward or in front of in the travel direction of the vehicle", as referred to herein, means the front side of the vehicle when traveling forward, but the rear side of the vehicle when traveling backward.

The above embodiments refer to the vehicle driven by an operator or driver, but may be used with a vehicle which is automatically driven by an ECU.

The invention claimed is:

1. A vehicle control apparatus which obtains, from a radar device which transmits a probe wave forward in a travel direction of an own vehicle and receives a reflected wave that is a reflection of the probe wave from a target, reflection information about the reflected wave, and which also obtains image information from an image capturing device which captures an image in front of the own vehicle, comprising:
   position detecting means for detecting a position of a detected target using said reflection information derived from said radar device;
   first determining means for determining whether said detected target is expected to be an obstacle to forward movement of said own vehicle in the travel direction thereof or not based on an intensity of the received reflected wave contained in said reflection information;
   second determining means for determining whether or not an obstacle which is expected to obstruct movement of the own vehicle exists at said position, as detected by said position detecting means, using the image information derived from said image capturing device; and
   collision avoidance means for performing control to avoid collision with the detected target based on a distance to said detected target,
   wherein based on said second determining means determining that the obstacle exists, and based on a distance between said own vehicle and said detected target being smaller than a given threshold value, said collision avoidance means determines the detected target as a target with which collision should be avoided regardless of a result of determination made by said first determining means, and wherein based on the distance between said own vehicle and said detected target being greater than the given threshold value, and based on said first determining means determining that the detected target is expected to be an obstacle, said collision avoidance means determines the detected target as a target with which collision should be avoided.

2. A vehicle control apparatus which obtains, from a radar device which transmits a probe wave forward in a travel direction of an own vehicle and receives a reflected wave that is a reflection of the probe wave from a target, reflection information about the reflected wave, and which also obtains image information from an image capturing device which captures an image in front of the own vehicle, comprising:
   position detecting means for detecting a position of a detected target using said reflection information derived from said radar device;
   first determining means for determining whether said detected target is expected to be an obstacle to forward movement of said own vehicle in the travel direction thereof or not based on an intensity of the received reflected wave contained in said reflection information;
   second determining means for determining whether an obstacle which is expected to obstruct movement of the own vehicle exists at said position, as detected by said position detecting means, or not using the image information derived from said image capturing device; and
   collision avoidance means for performing control to avoid collision with the detected target based on a distance to said detected target,
   wherein based on said second determining means determining that the obstacle exists, and based on the first determining means determining that said detected target is expected to be the obstacle, said collision avoidance means determines the detected target as a target with which collision should be avoided, and wherein based on the first determining means determining that said detected target is expected not to be the obstacle, and based on a distance between the own vehicle and the detected target being smaller than a given threshold value, said collision avoidance means determines the detected target as a target with which collision should be avoided.

3. A vehicle control apparatus as set forth in claim 1 or 2, wherein said second determining means determines whether said obstacle exits or not in a given cycle, and wherein based on a determination that said obstacle exists being successively made by the second determining means more than or equal to a given number of times, said collision avoidance means determines the detected target as a target with which collision should be avoided regardless of results of the determination made by said first determining means and said distance.

4. A vehicle control apparatus as set forth in any one of claims 1 to 3, wherein based on said second determining means determining that the obstacle is not present and based on the first determining means determining that the detected target is the obstacle, said collision avoidance means determines the detected target as a target with which collision should be avoided.

5. A vehicle control apparatus as set forth in any one of claims 1 to 4, wherein an object which is not said obstacle is an object which has a height lower than a minimum ground clearance of said own vehicle.

6. A vehicle control apparatus as set forth in any one of claims 1 to 5, wherein an object which is determined not to be said obstacle is an object which is located above an overall height of said own vehicle.

7. A vehicle control apparatus as set forth in claim 2, wherein based on said second determining means determining that the obstacle exists, and based on the first determining means determining that said detected target is expected to be the obstacle, said collision avoidance means determines the detected target as a target with which collision should be avoided regardless of the distance between said own vehicle and said detected target.

8. A vehicle control method which obtains, from a radar device which transmits a probe wave forward in a travel direction of an own vehicle and receives a reflected wave that is a reflection of the probe wave from a target, reflection information about the reflected wave, and which also obtains image information from an image capturing device which captures an image in front of the own vehicle, comprising:
   a position detecting step of detecting a position of a detected target using said reflection information derived from said radar device;
   a first determining step of determining whether said detected target is expected to be an obstacle to forward movement of said own vehicle in the travel direction thereof or not based on an intensity of the received reflected wave contained in said reflection information;

a second determining step of determining whether an obstacle which is expected to obstruct movement of the own vehicle exists at said position, as detected in said position detecting step, or not using the image information derived from said image capturing device; and a collision avoidance step of performing control to avoid collision with the detected target based on a distance to said detected target, wherein based on said second determining step determining that the obstacle exists, and based on a distance between said own vehicle and said detected target being smaller than a given threshold value, said collision avoidance step determines the detected target as a target with which collision should be avoided regardless of a result of determination made in said first determining step, and wherein based on the distance between said own vehicle and said detected target being greater than the given threshold value, and based on said first determining step determining that the detected target is expected to be the obstacle, said collision avoidance step determines the detected target as a target with which collision should be avoided.

9. A vehicle control method which obtains, from a radar device which transmits a probe wave forward in a travel direction of an own vehicle and receives a reflected wave that is a reflection of the probe wave from a target, reflection information about the reflected wave, and which also obtains image information from an image capturing device which captures an image in front of the own vehicle, comprising:

a position detecting step of detecting a position of a detected target using said reflection information derived from said radar device;

a first determining step of determining whether said detected target is expected to be an obstacle to forward movement of said own vehicle in the travel direction thereof or not based on an intensity of the received reflected wave contained in said reflection information;

a second determining step of determining whether an obstacle which is expected to obstruct movement of the own vehicle exists at said position, as detected in said position detecting step, or not using the image information derived from said image capturing device; and a collision avoidance step of performing control to avoid collision with the detected target based on a distance to said detected target, wherein based on said second determining step determining that the obstacle exists, and based on the first determining step determining that said detected target is expected to be the obstacle, said collision avoidance step determines the detected target as a target with which collision should be avoided, and wherein based on the first determining step determining that said detected target is expected not to be the obstacle, and based on a distance between the own vehicle and the detected target being smaller than a given threshold value, said collision avoidance step determines the detected target as a target with which collision should be avoided.

10. A vehicle control method as set forth in claim 9, wherein based on said second determining step determining that the obstacle exists, and based on the first determining step determining that said detected target is expected to be the obstacle, said collision avoidance step determines the detected target as a target with which collision should be avoided regardless of the distance between said own vehicle and said detected target.

* * * * *